(12) United States Patent
Beier et al.

(10) Patent No.: US 6,214,076 B1
(45) Date of Patent: Apr. 10, 2001

(54) ADJUSTABLE MOUNTING SYSTEM FOR FILTRATION MEDIA

(75) Inventors: Scott B. Beier; Rex A. Adams, both of Omaha, NE (US)

(73) Assignee: Products Unlimited, Inc., Omaha, NE (US)

( * ) Notice: Subject to any disclaimer, the term of this patent is extended or adjusted under 35 U.S.C. 154(b) by 0 days.

(21) Appl. No.: 09/247,728

(22) Filed: Feb. 9, 1999

(51) Int. Cl.[7] .................................................. B01D 46/52
(52) U.S. Cl. ................... 55/484; 55/492; 55/493; 55/496
(58) Field of Search ............................ 55/490, 491, 492, 55/493, 511, DIG. 31, 484, 496

(56) References Cited

U.S. PATENT DOCUMENTS

| | | | |
|---|---|---|---|
| 2,966,959 | * | 1/1961 | Newmann ............................. 55/490 |
| 3,871,849 | * | 3/1975 | Smith et al. ........................... 55/491 |
| 5,797,975 | * | 8/1998 | Davis ................................... 55/491 |
| 5,914,413 | * | 6/1999 | Anderson et al. .............. 55/DIG. 31 |
| 6,033,453 | * | 3/2000 | Weddell, III .................... 55/DIG. 31 |

FOREIGN PATENT DOCUMENTS

| | | | |
|---|---|---|---|
| 1448425 | * | 6/1966 | (FR) ..................................... 55/493 |
| 640873 | * | 8/1950 | (GB) ..................................... 55/493 |

OTHER PUBLICATIONS

Airguard Brochure, Undated.
Cameron/Yakima, Inc. Advertisement, Undated.

* cited by examiner

*Primary Examiner*—Duane S. Smith
(74) *Attorney, Agent, or Firm*—Zarley, McKee, Thomte, Voorhees & Sease; Dennis L. Thomte

(57) ABSTRACT

An adjustable mounting system for filtration media including first and second upstanding panel members having vertically disposed support rails provided at their forward ends. A plurality of filtration media support frames, which have an adjustable V-shape, are mounted on the support rails between the panel members.

16 Claims, 7 Drawing Sheets

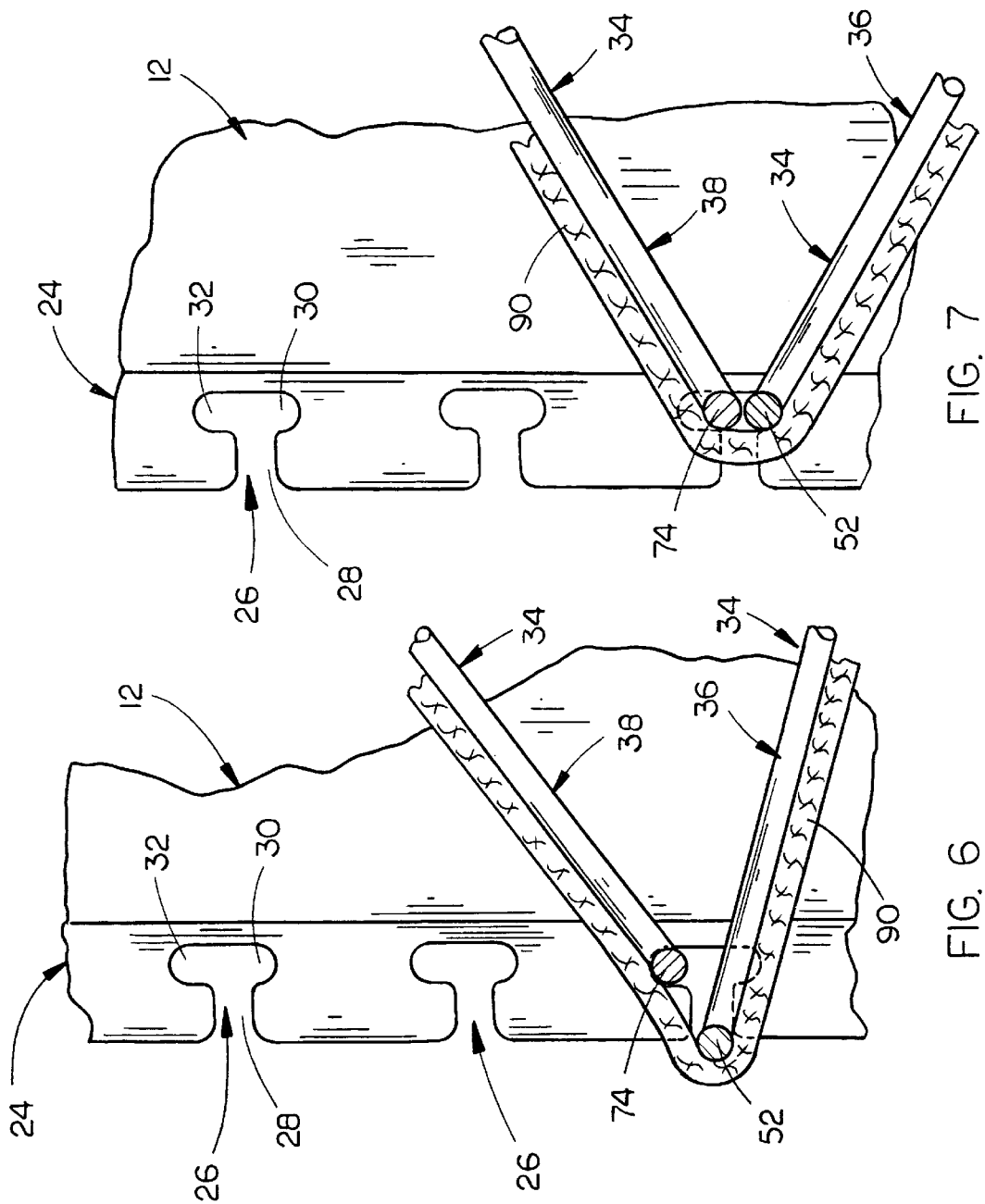

ADJUSTABLE MOUNTING SYSTEM FOR FILTRATION MEDIA

BACKGROUND OF THE INVENTION

1. Field of the Invention

This invention relates to a mounting system for filtration media and more particularly to an adjustable mounting system for filtration media which is being used to remove solid or liquid particulate from fluid streams.

2. Description of the Related Art

Residential and commercial heating, ventilating and air conditioning systems (HVAC systems) deal with the filtration of a variety of particulate, including dust, lint and pollen. Similar filtration systems are utilized in industrial spray painting booths to collect paint droplets from the exhaust airstream. Dust collection systems are also utilized in industrial settings to capture the by-products of manufacturing processes which are entrained in airstreams. Obviously, the removal of such particulate in all of these settings is desirable for reasons of health, comfort and aesthetic appeal.

Generally speaking, the filtration media or fluid filter is placed in the fluid stream to remove the particulate from the fluid stream. In many installations, a layer of filtration media is placed in the fluid stream at right angles thereto. Such a mounting system obviously limits the surface area of the filtration media to the cross-sectional area of the fluid flow. In other words, if the fluid flow area has a dimension of 24"×24", the area of the filtration media exposed to the fluid stream is 576 square inches. If the media surface area can be increased, the time period between change-outs of the filter media may be increased.

SUMMARY OF THE INVENTION

An adjustable mounting system for filtration media is disclosed comprising first and second upstanding panel members with each of the panel members having an upper end, a lower end, a forward edge, and a rearward edge. The upstanding panel members define an opening therebetween for the passage of exhaust air therebetween. First and second substantially vertically disposed supporting rails are provided oil the front edges of the first and second panel members, respectively. Each of the first and second support rails have a plurality of forwardly presented openings or slots formed therein. Preferably, a plurality of filtration media support frames having an adjustable V-shape are mounted on the support rails between the first and second panel members. A continuous layer of filtration media extends between the upper and lower ends of the first and second panel members and is supported by the filtration media support frames. The V-shape of each of the filtration media support frames may be adjusted to increase or decrease the angle of the V-shape. Each of the filtration media support frames are comprised of a pair of frame members hinged together so as to form a "V" when the frames are attached to the support rails. Depending on the slots used for attachment, the angle of the "V" may be varied. Additionally, the support frames are designed so that when closed to form the "V", the frames clamp or grab and retain the filter media to maintain the filter media in close proximity to the support frame.

It is therefore a principal object of the invention to provide a mounting system for filtration media.

A further object of the invention is to provide an adjustable mounting system for filtration media.

Yet another object of the invention is to provide an adjustable mounting system for supporting a continuous roll of filtration media thereon with the media being supported in an accordion or pleated arrangement.

Still another object of the invention is to provide an adjustable mounting system for filtration media which includes a pair of horizontally spaced and vertically disposed support rails including multiple slots provided therein for the attachment of individual filtration media support frames at various locations along the length of the rails.

Yet another object of the invention is to provide an adjustable mounting system for filtration media including individual hinged frames hinged together so as to form a "V" when the frames are attached to the rails with the angle of the "V" being selectively varied.

Still another object of the invention is to provide an adjustable mounting system for filtration media including a pair of horizontally spaced and vertically disposed support rails which support individual hinged frames which include means for maintaining the filtration media in close proximity thereto.

Still another object of the invention is to provide an adjustable mounting system for filtration media which provides increased filtration media surface area which results in longer periods between filter changes and lower power requirements due to the lower pressure drop through the media.

Still another object of the invention is to provide an adjustable mounting system for filtration media which enables the operator to tune the life of the media depending upon the particular operator's requirements.

Yet another object of the invention is to provide an adjustable mounting system for filtration media of the type described above wherein the number of media support frames may be increased in localized areas between the panel members to account for the concentration of overspray in the vicinity of a spray gun or the like.

These and other objects will be apparent to those skilled in the art.

BRIEF DESCRIPTION OF THE DRAWINGS

FIG. 6 is a partial vertical sectional view illustrating the manner in which the upper frame member of a support frame is initially positioned and the lower frame member is poised to be positioned in the support rail slot;

FIG. 7 illustrates the manner in which the pair of support frames cooperate to maintain the support frames and the filter media on the support rail;

DESCRIPTION OF THE PREFERRED EMBODIMENT

Figure 1:
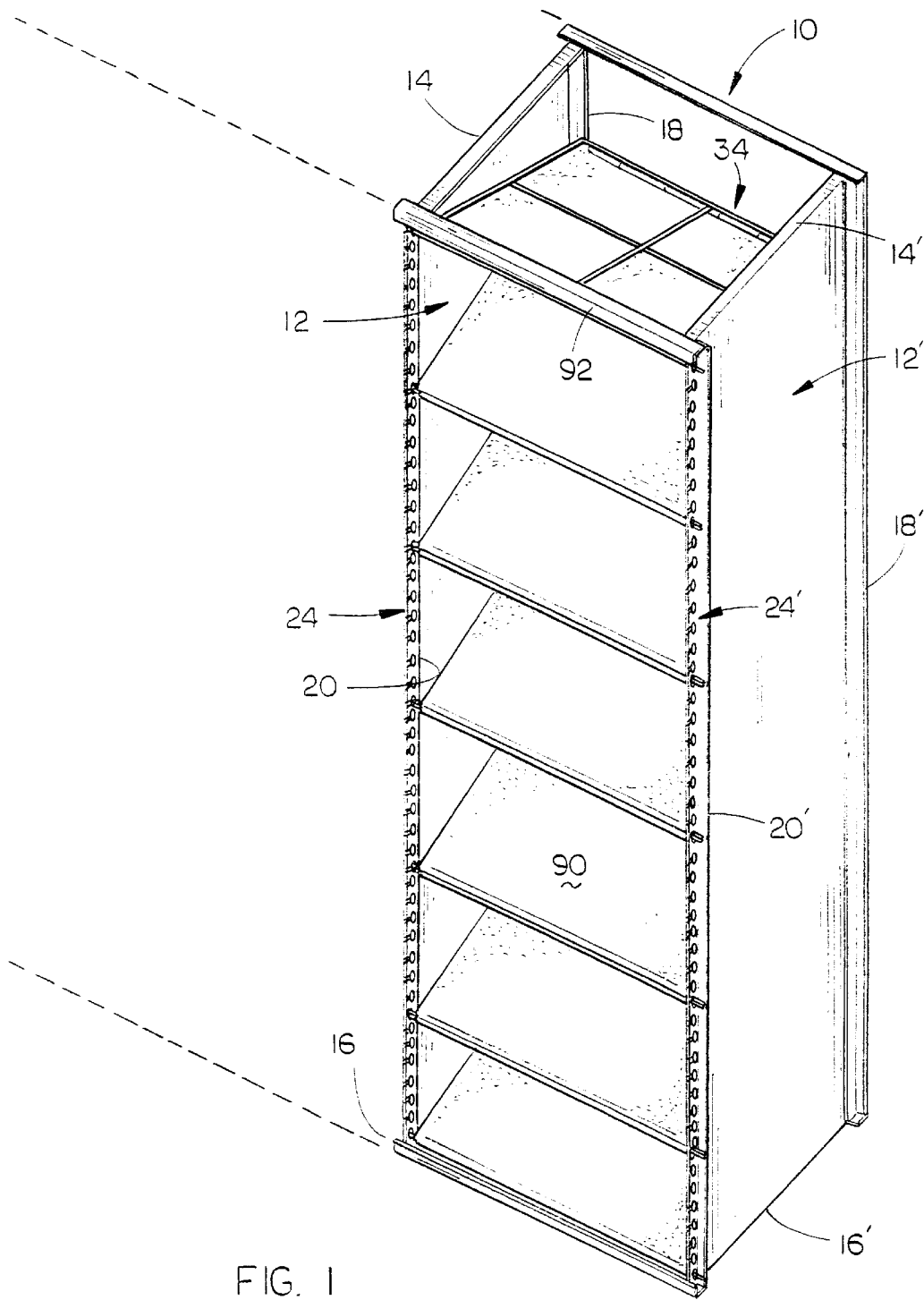
FIG. 1 is a front perspective view of the adjustable mounting system of this invention.

The numeral 10 refers generally to the adjustable mounting system of this invention. Although only a single adjustable mounting system 10 is illustrated in FIG. 1, it should be understood that any number of the single systems could be positioned in a side-to-side relationship to completely close an exhaust opening through which the fluid stream is passing.

System 10 includes a first upstanding panel member 12 having an upper end 14, lower end 16, rearward end 18, and forward end 20. Support rail 24, which will be described in more detail hereinafter, is positioned at the forward end of the panel 12, as seen in FIG. 1.

The numeral 12' refers to an upstanding panel member which is identical to panel member 12 and which is spaced therefrom. Although the panel members 12 and 12' are illustrated as being vertically disposed, which is the preferred embodiment, it is possible that the panel members 12 and 12' could be horizontally disposed if the situation required the same. At any rate, panel member 12' includes an upper end 14', lower end 16', rearward end 18', and forward end 20'. Support rail 24' is provided at the forward end 20' of panel member 12', as illustrated in FIG. 1 and which will be described in more detail hereinafter.

Figure 2:
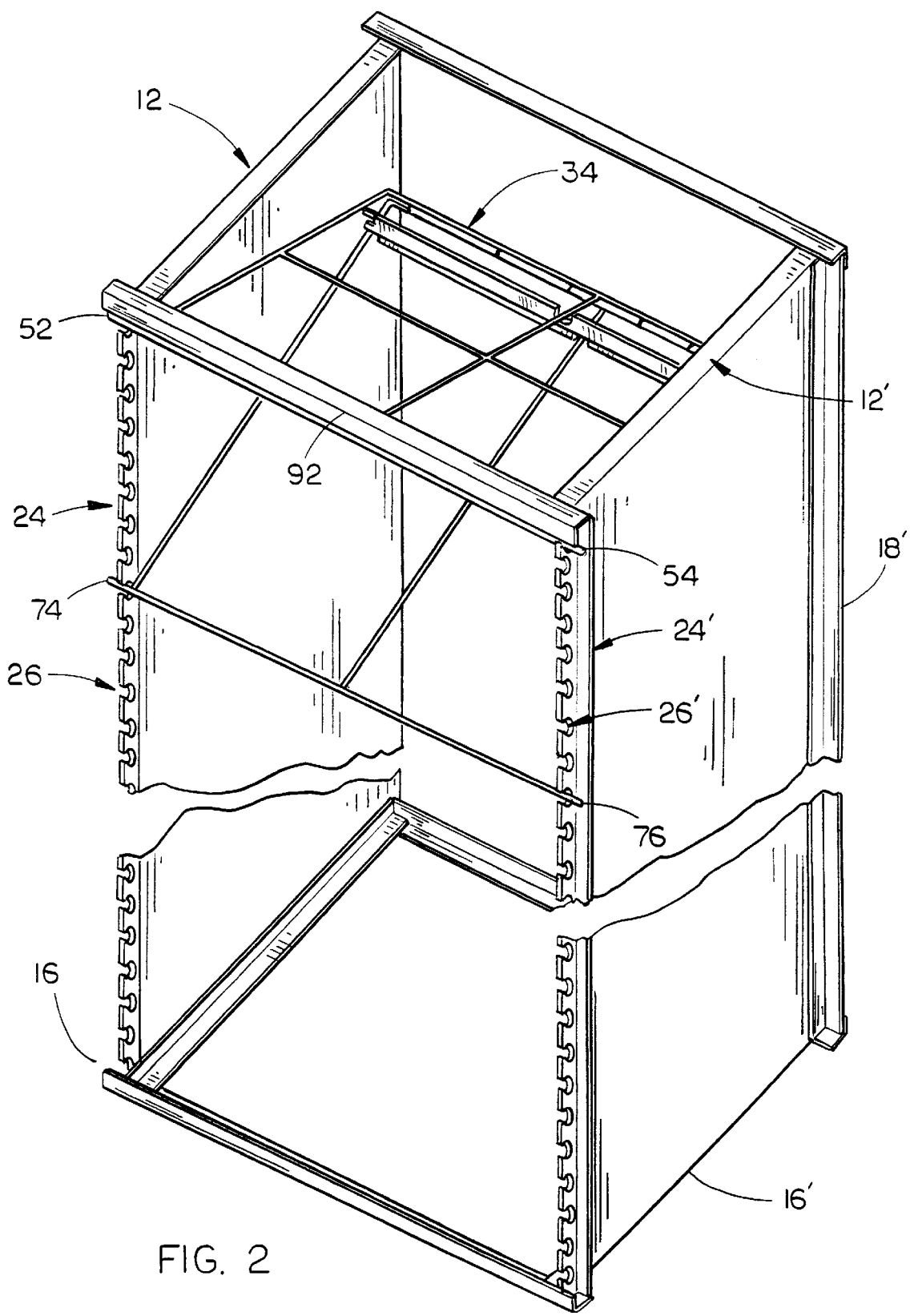
FIG. 2 is a partial front perspective view illustrating one of the filtration media support frames installed in the mounting system without the filtration media having been placed thereon.

Support rail 24 includes a plurality of vertically disposed and forwardly presented openings or slots 26 formed therein, as best seen in FIG. 6. Each of the slots 26 includes a forward slot portion 28 which communicates at its rearward end to the lower arcuate slot portion 30 and an upper arcuate slot portion 32. As seen in FIG. 6, the vertical height of slot portion 30 is less than the vertical height of slot portion 32, as will be described in more detail hereinafter. As seen in FIG. 2, support rail 24' includes a plurality of vertically spaced and forwardly presented openings or slots 26' which are identical to slots 26 and which are in horizontal alignment with the slots 26 in support rail 24.

Figure 3:
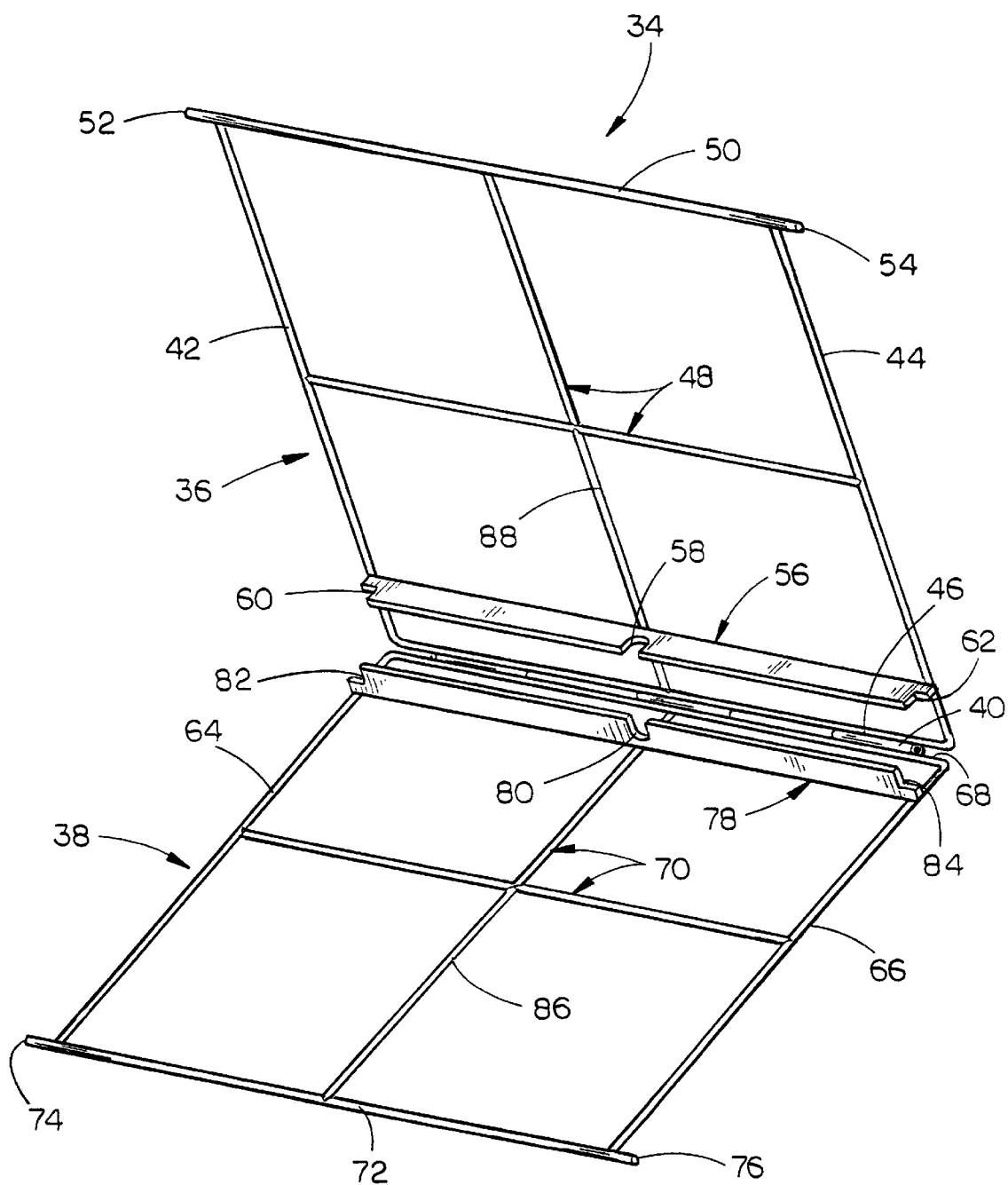
FIG. 3 is a perspective view of one of the support frames.

At least one filtration media support frame 34, and preferably a plurality of support frames 34, are positioned between the panel members 12 and 12', as illustrated in FIGS. 1 and 2. As best seen in FIG. 3, support frame 34 comprises frame members 36 and 38 hingedly connected together by means of hinge 40. Frame member 36 includes side rods 42 and 44 joined by end rod 46. The numeral 48 refers to a grid or gridwork of rods provided on frame member 36 for strengthening purposes and for supporting the filtration media thereon. Frame member 36 includes a mounting rod 50 having end portions 52 and 54 extending outwardly beyond side rods 42 and 44, respectively. Grip plate 56 is provided on the frame member 36 and extends therefrom, as best seen in FIG. 3. Plate 56 has an arcuate opening 58 formed at the center thereof and has notches 60 and 62 formed in its outer end.

Figure 4:
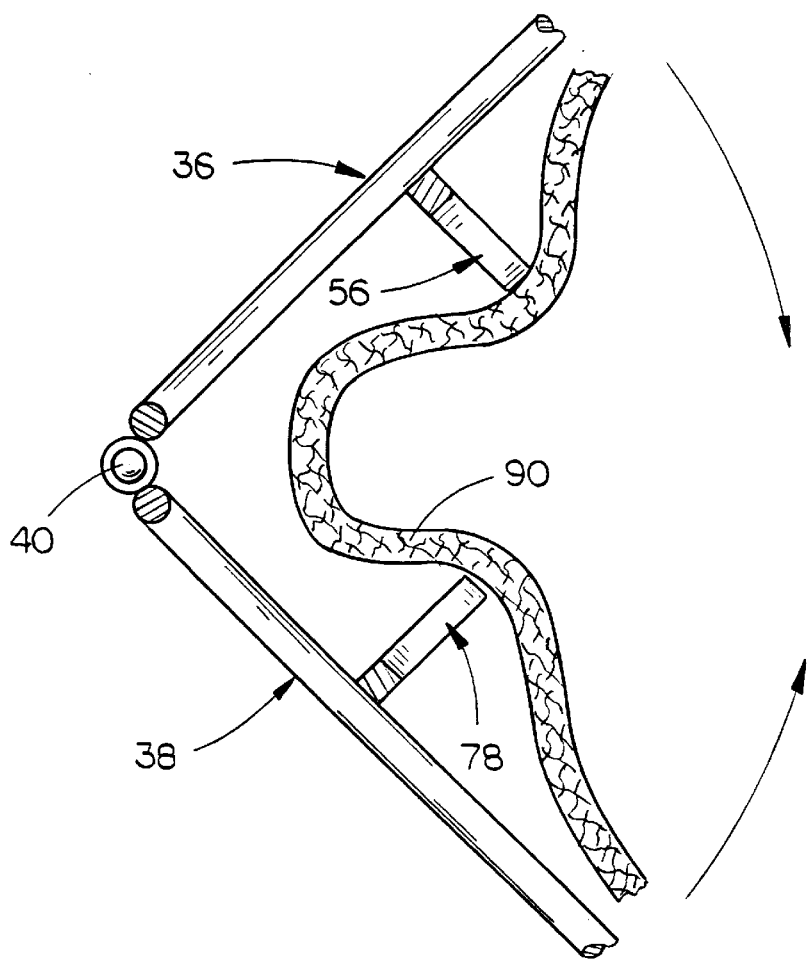
FIG. 4 is a partial sectional view illustrating the hinged frame members of the support frame being moved towards one another with the filtration media being positioned therebetween.
Figure 5:
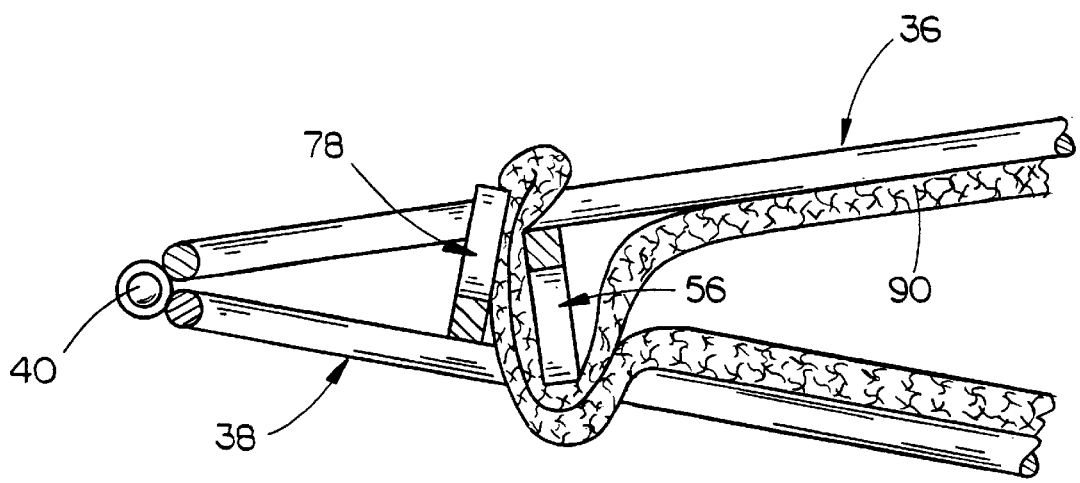
FIG. 5 is a view similar to FIG. 4 except that the frame members of the support frame have been completely closed to trap the filter media therebetween.

Similarly, frame member 38 includes side rods 64 and 66 joined by end rod 68, grid 70, mounting rod 72 having end portions 74 and 76, and grip plate 78 having arcuate opening 80 and notches 82 and 84. As seen in FIG. 5, the relative positioning of plates 78 and 56 on frame members 36 and 38 is such that they do not engage one another when the frame members 36 and 38 are hingedly moved from the position of FIG. 4 to the position of FIG. 5. Notches 60 and 62 are provided in plate 56 so as to receive side rods 64 and 66 therein when the frame members 36 and 38 are moved to the position of FIG. 5. Opening 58 in plate 56 is provided for receiving the center rod 86 or grid 70 when the frame members 36 and 38 are moved to the position of FIG. 5. Similarly, opening 80 is provided in plate 78 for receiving the center rod 88 when the frame members 36 and 38 are moved to the position of FIG. 5. Notches 82 and 84 are provided in plate 78 for receiving the side rods 42 and 44 of frame member when the frame members 36 and 38 are moved to the position of FIG. 5.

Assuming that the support frames 34 and the filtration media are to be installed between the panel members 12 and 12', as illustrated in FIG. 1, one end of a continuous roll of filtration media 90 would be either wrapped around end rod 50 or wrapped around the upper end of the cross piece 92 which extends between the upper ends of the support rails 24 and 24'. The filtration media 90 is then positioned adjacent the inner surface of the uppermost frame member 36 and is placed between the plates 56 and 78, as illustrated in FIG. 4, with the pivoting of the frame members 36 and 38 towards one another causing the filtration media 90 to be grabbed or gripped therebetween, as illustrated in FIG. 5. Support frame 34 is then positioned between the panel members 12 and 12' if already not so positioned with the end portions 52 and 54 of frame member 36 being positioned in the uppermost opening in the support rails 24 and 24', respectively. The end portions 74 and 76 of frame member 38 are then positioned in the desired slots 26 and 26', respectively, with the desired angle of the V-shape of the support frame 34 dictating that position.

As illustrated in FIG. 6, frame member 36 of the next lower support frame 34 is inserted behind filter media 90 between the support rails. The greater height of the slot portion 32 on support rails 24 and 24' enables the end portion 74 (and end portion 76) to be sufficiently moved upwardly to permit the end portion 52 (and end portion 54) of the next lower support frame 34 to be inserted between the support rails 24 and 24', as illustrated in FIG. 6. Further inward movement of the frame member 36 of the lower frame 34 enables the end portion 52 (and end portion 54) to be received in the slot portion 30, as illustrated in FIG. 7. When the end portion 52 (and end portion 54) is received in the slot portion 30, as illustrated in FIG. 7, the weight of the support frame 34 immediately above the support frame just installed will cause the end portion 74 (and end portion 76) to move downwardly in slot portion 32 which maintains end portion 52 (and end portion 54) in arcuate slot portion 30. When the end portions 74 and 52 (and end portions 76 and 54) are positioned as illustrated in FIG. 7, the support frames will be securely held in place.

The process described above is continued until the media is completely installed so as to cover the entire vertical section of the system with filtration media. Combining multiple sections allows very large areas to be covered. A benefit of the mounting system described above is the increased filtration media surface area provided thereby which results in longer periods between filter changes and lower power requirements due to the lower pressure drop through the media. An additional benefit of the instant invention is that the life of the filter can be tuned to the individual booth operator's requirements. In an industrial spray finishing application, it would be preferred to schedule a time for filter media change-out. By installing more frames 34 into the rails 24 and 24' via sharper "V" angles, an operator can increase the media surface area and lengthen the time period between change-outs. Fewer support frames 34 would mean less media surface area and a shortened time between change-outs. By engineering the number of frames to fit the application, an operator may schedule the time between change-outs to correspond with weekends, "graveyard" shifts, or even shift changes. The number of frames 34, and thereby the time between change-outs, can be "field-modified" without special tools. Furthermore, the number of frames could be easily changed to correspond with production load schedules.

An even more unique benefit of the mounting system described herein in industrial spray booths is that the number of frames can be increased in localized areas to account for the concentration of overspray in the vicinity of the spray gun. Additional frames in the heavier load areas would equalize the load rate to light load areas. The benefit is that the entire filter media need not be changed because a localized area becomes loaded. Since spray gun location is unique to each and every spray booth, the ability to uniquely modify the distribution of the filter surface area is quite desirable.

Figure 8:
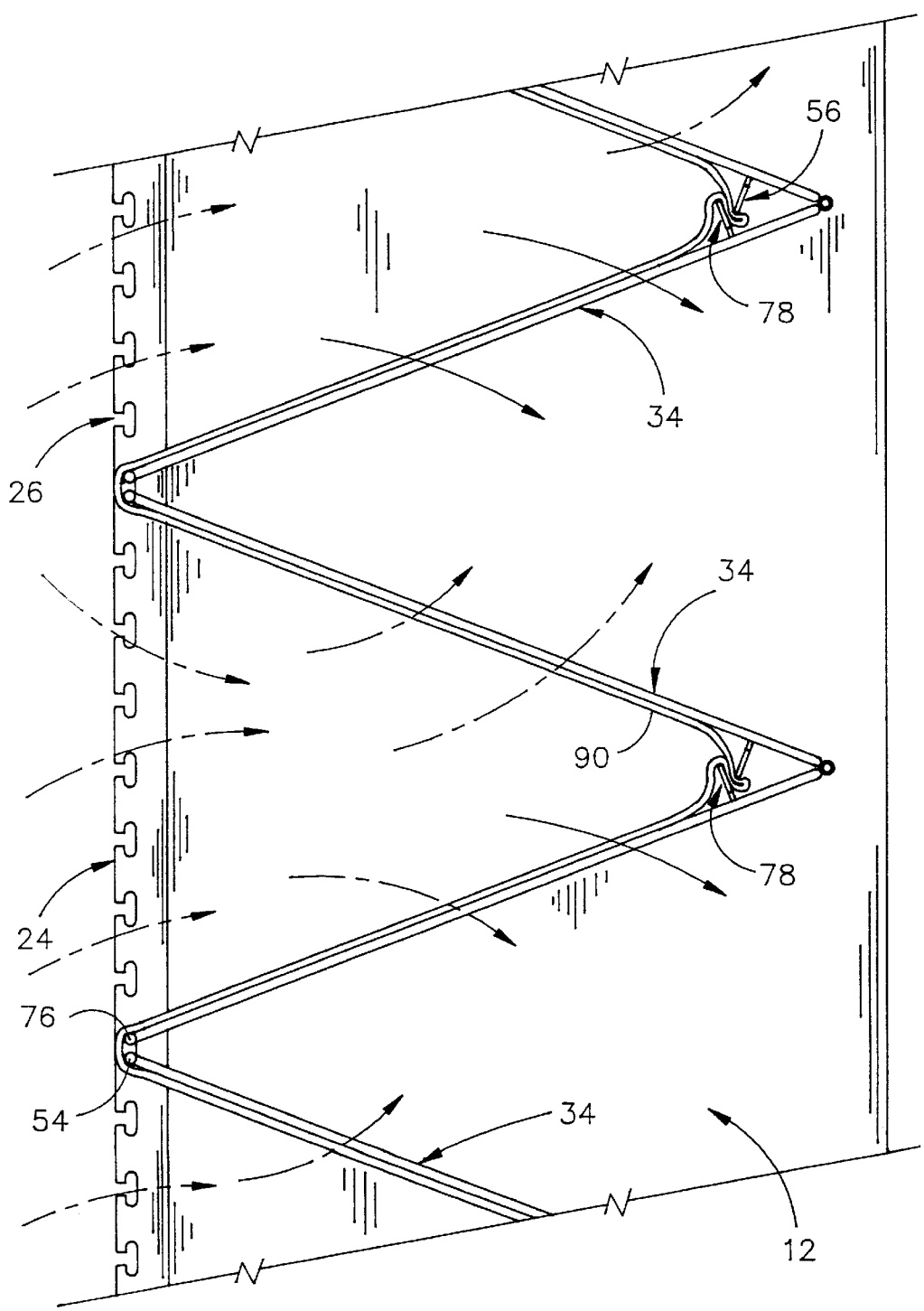
FIG. 8 is a partial side view illustrating the exhaust air being passed through the filtration media.
Figure 10:
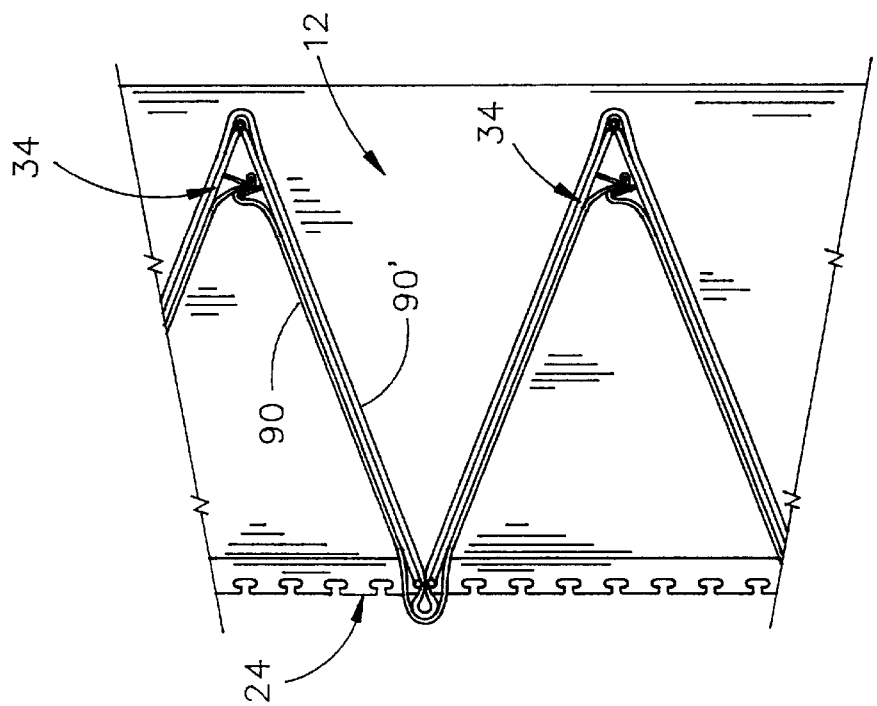
FIG. 10 is a view similar to FIG. 8 except that a second layer of filtration media is employed on the support frames.
Figure 9:
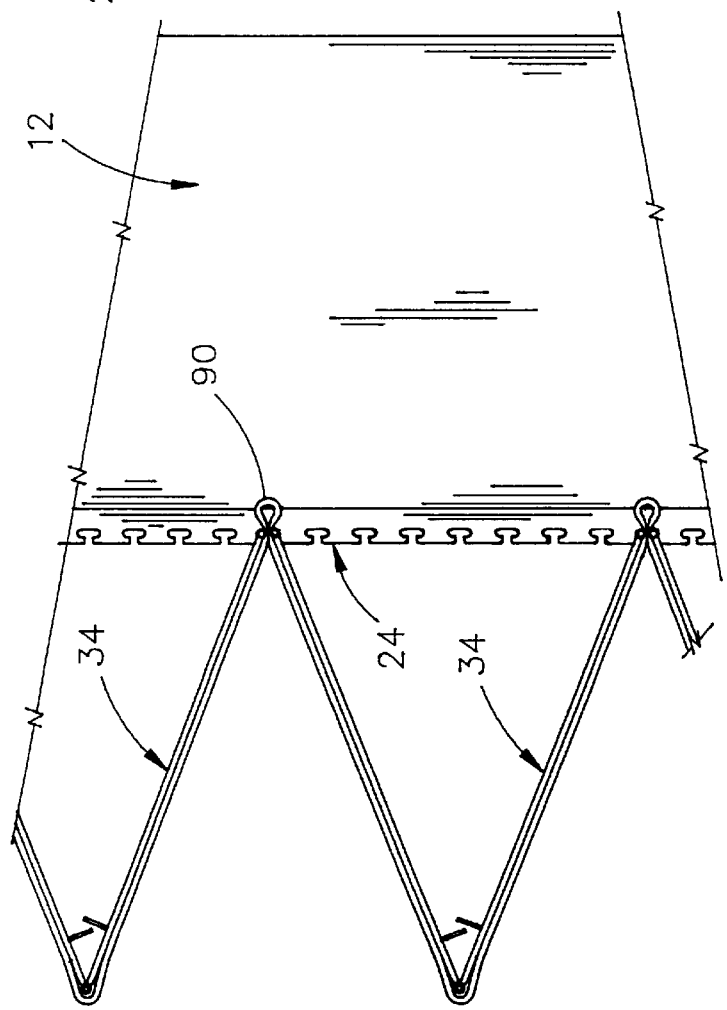
FIG. 9 is a view similar to FIG. 8 except that the support frames are positioned forwardly of the support rails.

FIG. 8 illustrates the filtration media installed when the system is to be used wherein the support frames 34 are positioned between the panels 12 and 12'. FIG. 9 illustrates the frame members 34 being mounted on the support rails in a somewhat different fashion in that the support frames 34 are positioned forwardly or upstream of the support rails. In such a case, the filtration media 90 is installed on the outer surface of the frame members 34 rather than on the inner surface of frame members 34 when the system is installed as illustrated in FIG. 1. FIG. 10 illustrates a somewhat different arrangement than that shown in FIG. 1 in that a second layer of filtration media 90' is installed on the downstream side of the support frames 34 to provide additional filtering capability to the system.

Although the support rails 24 and 24' are described as being located on the forward or upstream end of the panels 12 and 12', it is possible that the support rails 24 and 24' could be provided on the rearward or downstream end of the panels 12 and 12'.

Thus it can be seen that the invention accomplishes at least all of its stated objectives.

We claim:

1. An adjustable mounting system for filtration media, comprising:
   a first upstanding panel member having an upper end, a lower end, a forward edge, and a rearward edge;
   a second upstanding panel member horizontally spaced from said first panel member and having an upper end, a lower end, a front edge, and a back edge;
   said panel members defining an opening therebetween for the passage of exhaust air therebetween;
   a first substantially vertically disposed supporting rail at said front edge of said first panel member;
   a second substantially vertically disposed support rail at said front edge of said second panel member;
   each of said first and second support rails having a plurality of forwardly presented openings formed therein;
   and at least one filtration media support frame, having a first side received by selected openings in said first support rail and a second side received by said openings in said second support rail;
   and a layer of filtration media supported by said filtration media support frame which extends across the opening between said panel members whereby the exhaust air must pass therethrough.

2. The system of claim 1 wherein a plurality of support frames are received by said support rails and wherein said layer of filtration media is supported by said plurality of support frames.

3. The system of claim 2 wherein each of said support frames is V-shaped.

4. The system of claim 3 wherein said V-shaped support frames are adjustably mounted on said support rails.

5. The system of claim 1 wherein each of said forwardly presented openings comprises a slot.

6. The system of claim 5 wherein each of said slots comprises a first horizontally disposed and rearwardly extending slot portion having upper and lower arcuate slot portions at the rearward end thereof.

7. The system of claim 6 wherein said upper slot portion has a height less than said lower slot portion.

8. The system of claim 2 wherein each of said support frames has first and second upper rod portions which are received by said openings and has third and fourth lower rod portions which are received by said openings.

9. The system of claim 8 wherein each of said support frames comprises an upper frame portion hingedly secured to a lower frame portion and wherein said first and second upper rod portions extend from said upper frame portion and said third and fourth lower rod portions extend from said lower frame portion.

10. The system of claim 9 wherein said upper and lower frame portions include cooperating means for gripping the layer of filtration media therebetween to maintain said layer closely adjacent said upper and lower frame members.

11. The system of claim 10 wherein each of said upper and lower frame members includes a gridwork which is positioned on the downstream side of said layer of filtration media.

12. An adjustable mounting system for filtration media, comprising:
   a first upstanding support having an upper end, a lower end, a forward end, and a rearward end;
   a second upstanding support horizontally spaced from said first support and having an upper end, a lower end, a front end, and a back end;
   said support members defining an opening therebetween for the passage of exhaust air therebetween;
   and at least one filtration media support frame, having a first side detachably adjustably secured to said first support and a second side detachably adjustably secured to said second support;
   and a layer of filtration media supported by said filtration media support frame which extends across the opening between said first and second supports whereby the exhaust air must pass therethrough.

13. The system of claim 12 wherein a plurality of support frames are detachably secured to said first and second supports wherein said layer of filtration media is supported by said plurality of support frames.

14. The system of claim 13 wherein each of said support frames is V-shaped.

15. The system of claim 14 wherein said V-shaped support frames are vertically adjustably mounted on said first and second supports.

16. The system of claim 15 wherein each of said support frames comprises an upper frame portion hingedly secured to a lower frame portion.

* * * * *